United States Patent
Lortz et al.

(10) Patent No.: US 9,862,352 B2
(45) Date of Patent: Jan. 9, 2018

(54) USER IDENTIFICATION AND PERSONALIZED VEHICLE SETTINGS MANAGEMENT SYSTEM

(75) Inventors: Victor B. Lortz, Beaverton, OR (US); Branislav Kveton, Santa Clara, CA (US); Vijay Sarathi Kesavan, Hillsboro, OR (US); Somya Rathi, Sunnyvale, CA (US); Anand P. Rangarajan, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 350 days.

(21) Appl. No.: 13/997,210

(22) PCT Filed: Mar. 5, 2012

(86) PCT No.: PCT/US2012/027735
§ 371 (c)(1),
(2), (4) Date: Mar. 27, 2014

(87) PCT Pub. No.: WO2013/133791
PCT Pub. Date: Sep. 12, 2013

(65) Prior Publication Data
US 2014/0200737 A1    Jul. 17, 2014

(51) Int. Cl.
*B60R 25/00* (2013.01)
*B60R 25/25* (2013.01)
*B60R 16/037* (2006.01)
*B60W 50/00* (2006.01)

(52) U.S. Cl.
CPC ............ *B60R 25/00* (2013.01); *B60R 16/037* (2013.01); *B60R 25/25* (2013.01); *B60R 25/257* (2013.01); *B60W 50/0098* (2013.01); *B60W 2050/0075* (2013.01); *B60W 2540/28* (2013.01)

(58) Field of Classification Search
CPC ..... B60R 25/257; B60R 25/25; B60R 16/037; B60R 25/00; B60W 50/0098; B60W 2050/0075; B60W 2540/28; H04L 67/306
See application file for complete search history.

(56) References Cited

U.S. PATENT DOCUMENTS 6,282,475 B1    8/2001    Washington
2010/0019964 A1*    1/2010    Huang ............... G01M 17/06
                                                                 342/357.31

(Continued)

FOREIGN PATENT DOCUMENTS

GB    2401229    11/2004
JP    2006-004073 A    1/2006

(Continued)

OTHER PUBLICATIONS

European Search Report from related application 12870884.9 dated Oct. 6, 2015.

(Continued)

*Primary Examiner* — Thomas G Black
*Assistant Examiner* — Ana Thomas
(74) *Attorney, Agent, or Firm* — Grossman, Tucker, Perreault & Pfleger, PLLC (57) ABSTRACT

A system and method for identifying an occupant of a vehicle as an authorized user and managing settings and configurations of vehicle components based on personal preferences of the authorized user includes detecting occupant characteristics from multiple sensors, determining whether the occupant is an authorized user of the vehicle based on a comparison of the occupant characteristics with a user database including registered user profiles, and automatically adjusting vehicle cabin and/or control components based on personal preferences of the occupant identified as a registered user.

23 Claims, 4 Drawing Sheets

(56) References Cited

U.S. PATENT DOCUMENTS

| | | | |
|---|---|---|---|
| 2011/0304446 A1 | 12/2011 | Basson et al. | |
| 2012/0053793 A1 | 3/2012 | Sala et al. | |
| 2012/0226421 A1* | 9/2012 | Kote | B60R 25/20 701/51 |
| 2014/0195477 A1* | 7/2014 | Graumann | G06K 9/00369 707/609 |

FOREIGN PATENT DOCUMENTS

| | | |
|---|---|---|
| JP | 2007-177476 A | 7/2007 |
| JP | 2010-176487 A | 8/2010 |
| WO | 2007008159 | 1/2007 |
| WO | 2013/133791 A1 | 9/2013 |

OTHER PUBLICATIONS

International Preliminary Report on Patentability and Written Opinion received for PCT Patent Application No. PCT/US/2012/027735, dated Sep. 18, 2014, 9 Pages.

Zhu, Xiaojin, "Semi-Supervised Learning Literature Survey," Computer Sciences TR 1530, University of Wisconsin—Madison, Last modified on Jul. 19, 2008, 60 pages.

International Search Report and Written Opinion received for PCT application No. PCT/US2012/027735, dated Nov. 16, 2012, 12 Pages.

Erdogan et al., "Experiments on Decision Fusion for Driver Recognition", San Diego State University, 2007.

* cited by examiner

USER IDENTIFICATION AND PERSONALIZED VEHICLE SETTINGS MANAGEMENT SYSTEM

FIELD

The present disclosure relates to a system for identifying an occupant of a vehicle, and, more particularly, to an in-vehicle system configured to establish an identity of a driver and/or passengers in a vehicle as authorized users of the vehicle and to manage settings and configurations of vehicle components based on personal preferences of the authorized driver and/or passengers.

BACKGROUND

Motor vehicles have grown increasingly complex. For instance, some automobiles contain a plurality of microprocessors controlling a variety of operational and convenience features. For example, some automobiles include radio-frequency identification (RFID) systems included in devices, such as keys or key fobs, to grant access to a driver and/or passengers to the inside of a vehicle. These systems allow the driver to access and operate the vehicle, as well as the ability to use all functionalities of the vehicle.

Some motor vehicles also offer an increasing amount of driver selectable features and options. For example, some vehicles may allow each driver to store a set of preferred settings of various cabin components, including, for example, seat positions, mirror positions, pedal positions, steering wheel positions, radio settings, climate settings, cabin illumination, dash illumination, and navigation. Additionally, some vehicles may allow drivers to select dynamic settings of the vehicle, such as suspension compliance, brake and throttle sensitivity, and transmission shift-mode, to suit the driving style of the driver.

With an increase of the number of driver selectable features, some vehicles include a "memory" system to accommodate the vehicle settings of more than one driver, allowing each driver to store a set of preferred settings of various vehicle components as a driver profile. A driver's profile can be selected among the stored profiles when the driver enters the vehicle. A driver may select a stored driver profile via a selection mechanism, such as a key fob or user operable buttons on an instrument panel. Once the desired profile corresponding to the driver is selected, the vehicle retrieves the set of preferred settings and adjusts various vehicle components according to the stored profile settings.

These recent advances in motor vehicle technology, however, are not without drawbacks. For example, devices allowing driver access to and operation of the vehicle do not necessarily take into account whether the driver is authorized to access and/or operate the vehicle. Additionally, the customization of vehicle settings and/or selection of the driver profile requires manual input from the driver, wherein the increased complexity of driver controls may be a distraction to the driver and may have a negative impact on traffic safety.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

By way of overview, the present disclosure is generally directed to a system, apparatus, and method for identifying an occupant of a vehicle as an authorized user of the vehicle based on a comparison of occupant characteristics captured from multiple sensors with a user database of registered user profiles, a registered user being authorized to access and/or operate the vehicle. The various sensors may capture particular attributes of the occupant, including, but not limited to, physical characteristics and driving patterns. The system may be further configured to manage configurations and settings of vehicle cabin and vehicle control components based on personal preferences of authorized users.

In the event that the occupant is identified as a registered user, the system may be configured to allow access to and/or operation of the vehicle and to provide automatic adjustment of vehicle cabin and/or control components based on personal preferences of the identified registered user. Alternatively, in the event that the occupant is identified as identified as an unregistered user, the system may be configured to restrict access to and/or operation of the vehicle. The system may be further configured to communicate across a network with a network service configured to provide archiving, audit, escalation, and/or notification information to the system and/or registered users of the system.

A system consistent with the present disclosure provides enhanced security via automatic occupant identification and authorization, as well as automatic adjustment of vehicle cabin and/or control components, thereby providing improved interaction between a vehicle and an occupant of the vehicle, such as a driver and/or passengers.

Figure 1:
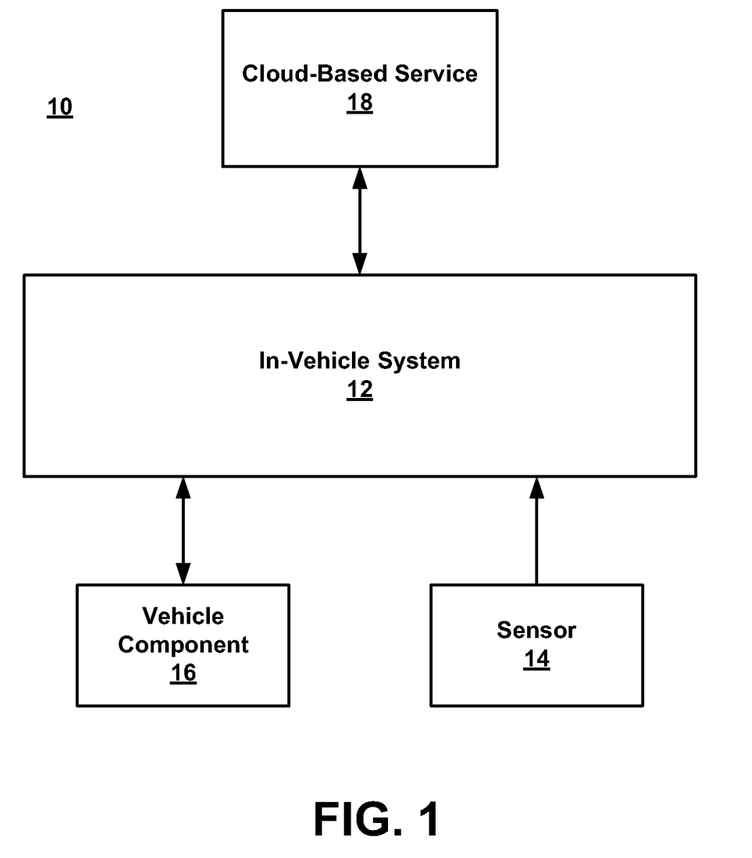
FIG. 1 is a block diagram illustrating one embodiment of a system for establishing the identity of an authorized driver and/or passengers of a vehicle and managing configurations and settings of vehicle components based on personal preferences of authorized users of the vehicle consistent with various embodiments of the present disclosure.

Turning to FIG. 1, one embodiment of a system 10 consistent with the present disclosure is generally illustrated. The system 10 includes an in-vehicle system 12, at least one sensor 14, at least one vehicle component 16, and a network service 18. As discussed in greater detail herein, the in-vehicle system 12 is configured to receive data captured from the at least one sensor 14, and identify at least one characteristic of a driver and/or passengers within the vehicle based on the captured data. The in-vehicle system 12 is further configured to establish an identity of the driver and/or passengers and determine whether the driver and/or passengers are authorized to access and/or operate the vehicle. In the event that the driver and/or passengers are determined to be authorized users, the in-vehicle system 12 is configured to manage configurations and settings of vehicle components 16 based on personal preferences of authorized users. The in-vehicle system 12 may be coupled to vehicle components 16 via a vehicle communications bus, such as a Controller Area Network (CAN) bus, for example.

More specifically, the in-vehicle system 12 may be coupled to control modules of each vehicle component 16 for controlling such components. The in-vehicle system 12 may include, for example, an in-vehicle infotainment (IVI) system. The in-vehicle system 12 is further configured to communicate with the network service 18, such as a cloud-based server, network service, etc. The network service 18 is configured to provide the in-vehicle system with archiving, audit, and/or escalation services. In addition, the network service 18 may be configured to provide notification information to authorized drivers and passengers.

Figure 2:
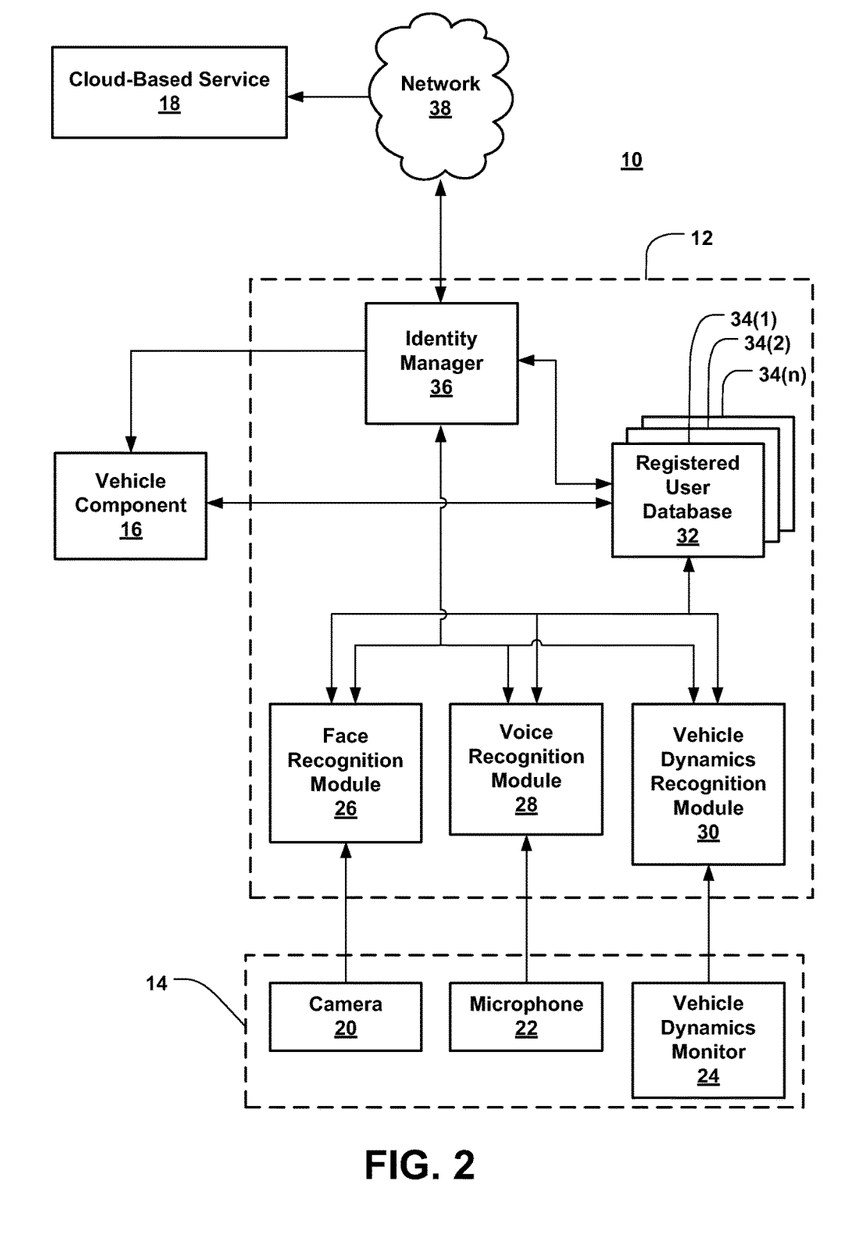
FIG. 2 is a block diagram illustrating the system of FIG. 1 in greater detail.

Turning now to FIG. 2, the system 10 of FIG. 1 is illustrated in greater detail. As previously discussed, the in-vehicle system 12 is configured to receive data captured from at least one sensor 14. As shown, the system 10 may include a variety of sensors configured to capture various attributes of one or more occupants (i.e. driver and/or passengers) of the vehicle, such as physical characteristics and/or driving patterns. The sensors may include, but are not limited to, steering, acceleration, and/or braking monitors, electronic key proximity sensors, cameras, microphones, seat weight sensors, and various biometric characteristics sensors (fingerprints, finger veins, iris, retina, handprint, etc.). For example, in the illustrated embodiment, the system 10 includes at least one camera 20 configured to capture images of a driver and/or passengers, at least one microphone 22 configured to capture voice data of the driver and/or passengers, and a vehicle dynamics monitor(s) 24 configured to capture a driving style (e.g. braking, acceleration, etc.) of the driver.

The in-vehicle system 12 may further include recognition modules 26, 28, 30, wherein each of the recognition modules is configured to receive data captured by an associated one of the sensors and establish one or more user models 42(1)-42(n) (hereinafter referred to as "user model 42") associated with a driver and/or passengers of the vehicle based on the captured data, which is described in greater detail herein. Each of the recognition modules may be further configured to establish potential identity matches of a driver and/or passengers by comparing one or more user models 42(1)-42(n) and associated data with stored data corresponding to user profiles 34(1)-34(n) (hereinafter referred to as "user profile 34") in a registered user database 32. The stored data in a user profile 34 may include previously captured data obtained during a previous driving episode in which an occupant was identified as a registered user. Additionally, the stored data in a user profile may include data captured during the setting up of a registered user profile.

Each user profile 34 includes identifying data and/or personal preferences of an associated user. The identifying data, for example, may include various physical characteristics (e.g. facial data, voice data, weight data), as well as driving characteristics. The personal preferences, for example, may include a user's desired settings and/or positioning of vehicle components 16, such as seat positions, mirror positions, pedal positions, steering wheel positions, radio settings, climate settings, cabin illumination, dash illumination, and navigation, as well as suspension compliance, brake and throttle sensitivity, and transmission shift-mode.

In the illustrated embodiment, the in-vehicle system 12 includes a face recognition module 26, a voice recognition module 28, and a vehicle dynamics recognition module 30. The face recognition module 26 is configured to receive one or more digital images captured by the at least one camera 20. The camera 20 includes any device (known or later discovered) for capturing digital images representative of an environment that includes one or more persons, and may have adequate resolution for face analysis of the one or more persons in the environment as described herein. For example, the camera 20 may include a still camera (i.e., a camera configured to capture still photographs) or a video camera (i.e., a camera configured to capture a plurality of moving images in a plurality of frames). The camera 20 may be configured to capture images in the visible spectrum or with other portions of the electromagnetic spectrum (e.g., but not limited to, the infrared spectrum, ultraviolet spectrum, etc.).

In one embodiment, the system 10 may include a single camera 20 configured to capture images including all occupants of the vehicle, including the driver and passengers. In other embodiments, the system 10 may include multiple cameras positioned throughout the vehicle and configured to capture images of an associated occupant of the vehicle. For example, the system 10 may include multiple cameras, each of which being positioned relative to the driver and passenger seats so as to capture images of an associated driver and/or passengers.

Upon receiving the image(s) from the camera 20, the face recognition module 26 may be configured to identify a face and/or face region within the image(s) and determine one or more characteristics of the driver and/or passengers captured in the image(s). As generally understood by one of ordinary skill in the art, the face recognition module 26 may be configured to use any known internal biometric modeling and/or analyzing methodology to identify face and/or face region with the image(s). For example, the face recognition module 26 may include custom, proprietary, known and/or after-developed face recognition and facial characteristics code (or instruction sets), hardware, and/or firmware that are generally well-defined and operable to receive a standard format image and identify, at least to a certain extent, a face and one or more facial characteristics in the image. Additionally, the face recognition module 26 may be configured to identify a face and/or facial characteristics of a driver and/or passengers by extracting landmarks or features from the image of the driver and/or passengers' face(s). For example, the face recognition module 26 may analyze the relative position, size, and/or shape of the eyes, nose, cheekbones, and jaw, for example, to form a facial pattern.

Figure 3:
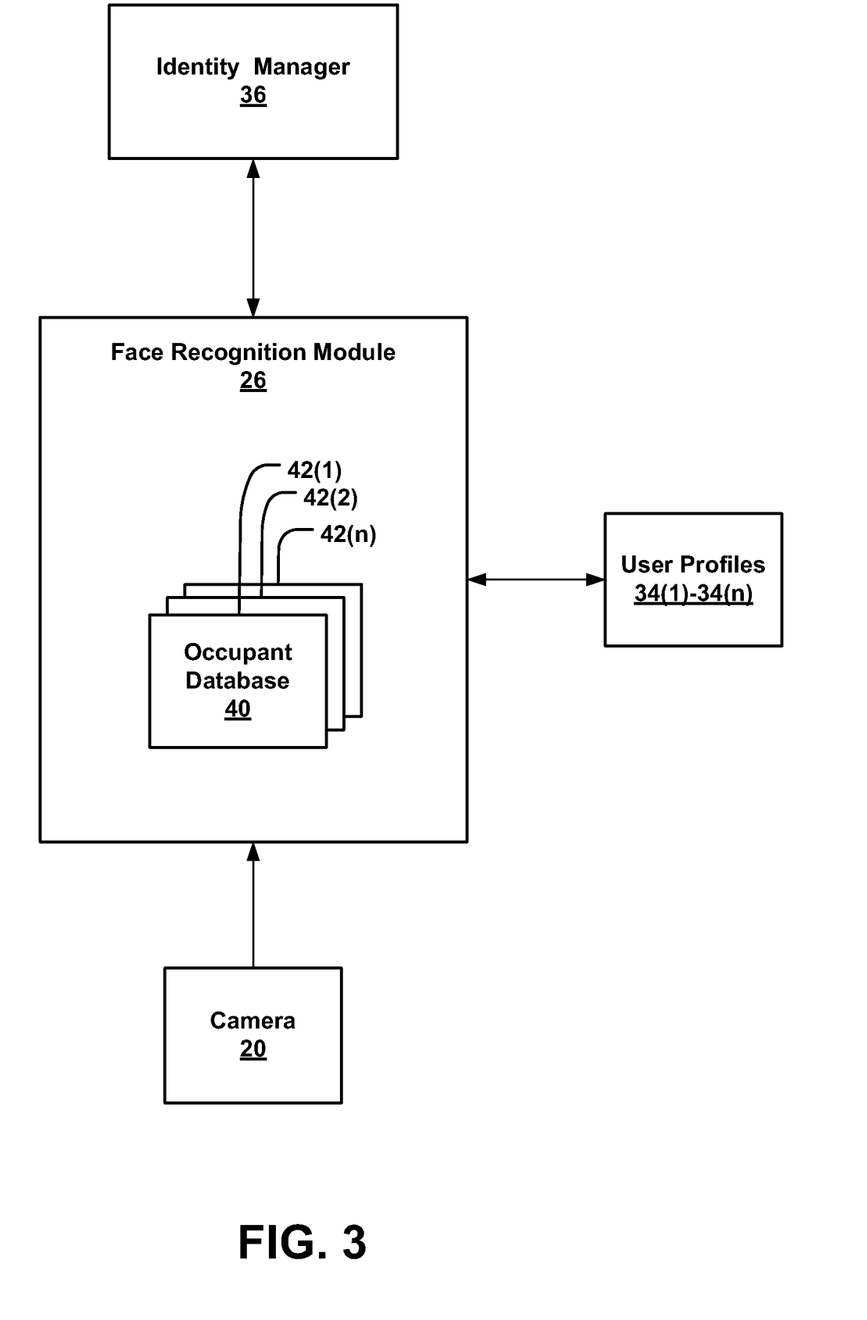
FIG. 3 is a block diagram illustrating one embodiment of a recognition module consistent with various embodiments of the present disclosure.
Figure 4:
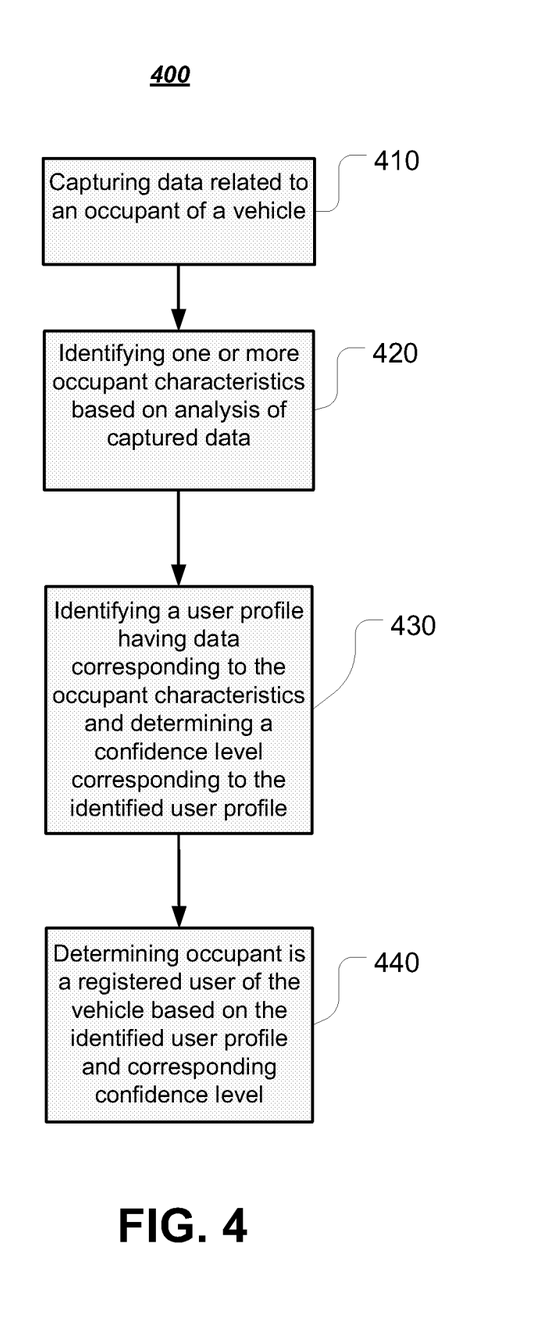
FIG. 4 is a flow diagram illustrating one embodiment for identifying an occupant of a vehicle as an authorized user of the vehicle consistent with various embodiments of the present disclosure.

Upon identifying facial characteristics and/or patterns of one or more occupants of the vehicle, the face recognition module 26 may be configured to compare the identified facial patterns to user models 42(1)-42(n) of an occupant database 40, as shown in FIG. 3, to establish potential matches of the occupant in the image(s). In particular, each of the recognition modules 26, 28, 30, includes an occupant database containing one or more user models, wherein each user model maps input from an associated sensor corresponding to an occupant that has accessed and/or operated the vehicle. Each user model includes identifying data of the associated occupant. For example, in the case of the face recognition module 26, each user model 42 includes identified facial characteristics and/or patterns of an associated occupant.

The face recognition module 26 may use identified facial patterns of an occupant of the vehicle to search the user models 42(1)-42(n) for images with matching facial patterns. In particular, the face recognition module 26 may be configured to compare the identified facial patterns with images stored in the user models 42(1)-42(n). The comparison may be based on template matching techniques applied to a set of salient facial features. Such known face recognition systems may be based on, but are not limited to, geometric techniques (which looks at distinguishing features) and/or photometric techniques (which is a statistical approach that distill an image into values and comparing the values with templates to eliminate variances. In the event that a match is not found, the face recognition module 26 may be configured to create a new user model 42 including the identified facial patterns of the image(s), such that on future driving episodes, the occupant may be identified.

Upon identifying a potential user model 42 that match the driver and/or passengers of the vehicle, the face recognition module 26 may be further configured to compare the matching user model 42, including the associated facial patterns, to the user profiles 34(1)-34(n) in the registered user database 32 to establish a potential match of the driver and/or passengers in the image(s). In particular, the face recognition module 26 may use the identified facial patterns associated with the matching user models 42 to search the user profiles 34(1)-34(n) for other images with matching facial pattern. The comparison may be based on template matching techniques applied to a set of salient facial features. Such known face recognition systems may be based on, but are not limited to, geometric techniques (which looks at distinguishing features) and/or photometric techniques (which is a statistical approach that distill an image into values and comparing the values with templates to eliminate variances). If potential matches are found after searching user profiles 34 of the registered user database 32, the face recognition module 26 may be configured to determine a confidence level associated with each potential match. The confidence level may be expressed as an estimated probability value ranging from 0 (complete mismatch) to 1 (certain match). Standard multi-factor statistical analysis techniques may be used to derive the confidence level. For example, linear discriminate analysis, weighted according to knowledge about the relative prevalence of specific human facial features, may be used.

The voice recognition module 28 is configured to receive voice data from a driver and/or passengers captured by the at least one microphone 22. The microphone 22 includes any device (known or later discovered) for capturing voice data of one or more persons, and may have adequate digital resolution for voice analysis of the one or more persons. In one embodiment, the system 10 may include a single microphone 22 configured to capture voice data including all occupants of the vehicle, including the driver and passengers. In other embodiments, the system 10 may include multiple microphones positioned throughout the vehicle and configured to capture voice data an associated occupant of the vehicle. For example, the system 10 may include multiple microphones; each of which being positioned relative to the driver and passenger seats so as to capture voice data of an associated driver and/or passengers.

Upon receiving the voice data from the microphone 22, the voice recognition module 28 may be configured to identify a voice of the driver and/or passengers. As generally understood by one of ordinary skill in the art, the voice recognition module 28 may be configured to use any known voice analyzing methodology to identify particular voice pattern with the voice data. For example, the voice recognition module 28 may include custom, proprietary, known and/or after-developed voice recognition and characteristics code (or instruction sets), hardware, and/or firmware that are generally well-defined and operable to receive voice data and identify a voice and one or more voice characteristics.

Similar to the face recognition module 26, the voice recognition module 28 may include an occupant database having one or more user models, wherein the voice recognition module 28 may identify user models that match an occupant of the vehicle based on the identified voice patterns. Upon identifying user models that match the driver and/or passengers of the vehicle, the voice recognition module 28 may be further configured to compare the matching user models, including the associated voice patterns, to the user profiles 34(1)-34(n) in the registered user database 32 to establish a potential match of the driver and/or passengers in the voice data. In particular, the voice recognition module 28 may use associated voice pattern(s) of the matching user models to search the user profiles 34(1)-34(n) for other voice data with matching voice patterns to identify the driver and/or passengers. If potential matches are found after searching the registered user database 32, the voice recognition module 28 may be configured to determine a confidence level associated with each potential match.

The vehicle dynamics recognition module 30 is configured to receive data captured by the vehicle dynamics monitor 24. As previously discussed, the vehicle dynamics monitor 24 may be configured to capture data corresponding to a driving style of the driver. For example, the vehicle dynamics monitor 24 may capture data related to particular vehicle components associated with vehicle performance. In particular, the vehicle dynamics monitor 24 may capture data related to, for example, braking, acceleration, turning, yaw, etc. Upon receiving data from the vehicle dynamics monitor 24, the vehicle dynamics recognition module 30 may be configured to identify a driving style of the driver. As generally understood by one of ordinary skill in the art, the vehicle dynamics recognition module 30 may be configured to use any known vehicle performance analyzing methodology to identify particular driving patterns from the captured data.

Similar to the face and voice recognition modules 26, 28, the vehicle dynamics recognition module 30 may include an occupant database having one or more user models, wherein the vehicle dynamics recognition module 30 may identify user models that match a driver of the vehicle based on the identified driving patterns. Upon identifying user models that match the driver of the vehicle based on driving patterns, the vehicle dynamics recognition module 30 may be further configured to compare the matching user models, including the associated driving patterns, to the user profiles 34(1)-34(n) in the registered user database 32 to establish the identity of the driver. In particular, the vehicle dynamics recognition module 30 may use the driving patterns of the matching user models to search the user profiles 34(1)-34(n) for other driving data with matching driving patterns to identify the driver. If potential matches are found after searching the registered user database 32, the vehicle dynamics recognition module 30 may be configured to determine a confidence level associated with each potential match.

The recognition modules 26, 28, 30 may include internal modeling and analyzing methodology that use various probabilistic analysis techniques for selecting potential identity matches based on the comparison between occupant characteristics (facial, voice, driving style) and the user models 42(1)-42(n) and/or the user profiles 34(1)-34(n). For example, the recognition modules 26, 28, 30 may utilize any known statistical pattern recognition algorithms, such as weighted or unweighted linear subspace analysis based on features measured by respective sensors.

Upon establishing potential matches from the registered user database 32, each of the recognition modules 26, 28, 30 is configured to provide the potential matches and corresponding confidence levels to an identity manager 36. The identity manager 36 is configured to evaluate each of the potential matches and corresponding confidence levels and determine a global assessment of the identity of the driver and/or passengers of the vehicle, establishing whether the driver and/or passengers are registered users of the vehicle. In particular, the identity manager 36 is configured to generate an overall confidence level based on the potential matches and corresponding confidence levels received from each of the recognition modules 26, 28, 30. If the overall confidence level meets or exceeds a pre-defined threshold value, the identity manager 36 determines that the driver and/or passengers are registered users. Alternatively, if the overall confidence level is below the pre-defined threshold value, the identity manager 36 may determine that the driver and/or passengers are not registered users.

For example, an occupant may enter the vehicle and sit in the driver's seat (hereinafter referred to as "driver"). The camera 20 may capture images of the driver and the microphone 22 may capture voice data of the driver, wherein the images and voice data may be received by the face recognition module 26 and the voice recognition module 28, respectively. The face recognition module 26 may compare identified facial patterns of the images to the user models 42(1)-42(n) in the occupant database 40 to establish an identity of the driver in the images. For example, the face recognition module 26 may identify user model 42(1) as a potential match to the occupant. In turn, the face recognition module 26 may compare user model 42(1), and the corresponding facial patterns, to the user profiles 34(1)-34(n) in the registered user database 32 to establish the identity of the driver in the images. The face recognition module 26 may use a probabilistic analysis technique to identify a potential matching user profile 34, wherein the face recognition module 26 may then generate a confidence level associated with the potential matching user profile 34. For example, the face recognition module 26 may identify user profile 34(1) as a potential match having an estimated probability value of 0.95 for a confidence level.

Similarly, the voice recognition module 28 may compare an identified voice pattern from the voice data to user models of an occupant database to establish the identity of the driver. In turn, the voice recognition module 28 may compare an identified user model, and the corresponding voice patterns, to the user profiles 34(1)-34(n) to establish the identity of the driver in the voice data. Based on the comparison, the voice recognition module 28 may identify user profile 34(1) as a potential match having a 0.90 confidence level.

The face recognition module 26 and the voice recognition module 28 may then provide the potential matching user profiles 34 and corresponding confidence levels to the identity manager 36, wherein the identity manager 36 is configured to determine an assessment of the identity of the driver. In particular, the identity manager 36 generates an overall confidence level based on the potential matches and corresponding confidence levels by performing statistical analysis, such as linear subspace projection, whereby the identity manager 36 may treat each recognition module as a logical sensor that provides an estimate of identity rather than direct measurement of physical traits. The identity manager 36 may also take into consideration other factors, such as time of day and presence in the car of other devices such user-assigned keys and/or cell phones. In accordance with the example above, an overall confidence level generated by the identity manager 36 may exceed a pre-defined threshold value, wherein the identity manager 36 establishes that the identity of the driver matches user profile 34(1), thereby establishing that the driver is a registered user.

In the event that the driver and/or passengers are identified as registered users, the in-vehicle system 12 may be configured to allow registered users access to and operation of the vehicle. For example, the in-vehicle system 12 may be configured to communicate with vehicle components 16 related to vehicle security, including, but not limited to, a starting system of the vehicle. When an occupant of the vehicle is identified as a registered user, the in-vehicle system 12 may allow the identified occupant to start and operate the vehicle. In accordance with the example above, upon the establishing that the identity of the driver matches user profile 34(1), the in-vehicle system 12 may then allow the driver to start and operate the vehicle.

Additionally, the in-vehicle system 12 may be further configured to manage configurations and settings of vehicle components 16 based on personal preferences of an associated registered user. More specifically, the in-vehicle system 12 may be configured to communicate with vehicle components 16 related to vehicle cabin components (e.g. seats, mirrors, pedals, steering wheel, radio, climate controls, etc.) and vehicle control components (e.g., engine, transmission, and suspension parameters). In accordance with the example above, when the driver is identified as matching user profile 34(1), the in-vehicle system 12 is configured to transmit the personal preferences of the user profile 34(1) to the vehicle components 16, wherein the vehicle components 16 may be set and/or configured according to the personal preferences of the user profile 34(1).

The personal preferences of the user profile 34(1) may include the driver's desired settings and/or positioning of vehicle components 16, such as seat positions, mirror positions, pedal positions, steering wheel positions, radio settings, climate settings, cabin illumination, dash illumination, and navigation, as well as suspension compliance, brake and throttle sensitivity, and transmission shift-mode. In one embodiment, the in-vehicle system 12 may communicate with controllers of the components 16, wherein the controllers execute the personal preferences of the user profile 34(1) by controlling the associated vehicle component.

Additionally, the in-vehicle system 12 may be configured to automatically update a user model 42 and/or a user profile 34 when an occupant is identified as a registered user. Automatic updating of a user model 42 and/or user profile 32 may improve the ability of a recognition module to establish a potential match with a higher degree of confidence over a period of time (e.g. period of driving episodes). As previously discussed, the identity manager 36 is configured to receive and evaluate potential matches and corresponding confidence levels from each of the recognition modules and determine a global assessment, including an overall confidence level, of the identity of the driver and/or passengers of the vehicle based on the evaluation. When an overall confidence level generated by the identity manager 36 meets or exceeds a pre-defined threshold value, the identity manager 36 determines that that the identified occupant matches a corresponding user profile 34, thereby establishing that the identified occupant is a registered user.

In the event that an occupant is determined to be a registered user, the identity manager 36 may be configured to communicate with and provide each recognition module with the global assessment, thereby informing each recognition module that the occupant has been identified as a registered user. In turn, each recognition module may be configured to adjust a user model associated with the occupant identified as a registered user. For example, in accordance with the example above, upon being informed by the identity manager 36 that the occupant has been identified as a registered user, the face recognition module 26 may adjust user model 42(1) to account for the occupant identified as a registered user. In particular, the face recognition module 26 may update user model 42(1) with the images of the occupant captured by the camera 20, wherein the mapping parameters of user model 42(1) may be adjusted based on the images. In turn, user model 42(1) may evolve over a period of time (e.g., period of driving episodes), thereby improving accuracy in occupant recognition in future driving episodes. The voice recognition module 28 and vehicle dynamics recognition module 30 may be similarly configured to adjust user models in response to the establishment of an identified registered user.

In addition, the in-vehicle system 12 may be configured to automatically update a user profile 34 when an occupant is identified as a registered user. In particular, the identity manager 36 may be configured to update an associated user profile 34 with characteristics of the identified occupant captured by each of the sensors. In accordance with the ongoing example, the corresponding user profile 34(1) may be updated with the images and voice data of the driver captured by the camera 20 and microphone 22. In addition, during operation of the vehicle, other data related to personal preferences of the registered user (e.g. radio settings, climate control settings, driving pattern, etc.) may be captured by associated sensors, wherein the user profile 34 associated with the registered user may be automatically updated with such data. By automatically updating a user profile 34 with data relating to characteristics of an identified registered user, the in-vehicle system 12 may improve vehicle and driver interaction.

The automatic updating of a user model and/or user profile 34 may allow the in-vehicle system 12 to perform more reliably in the event that one or more of the sensors fail and/or when there are variations in the characteristics of an occupant. For example, over a period of time (e.g., driver episodes) a driver's physical appearance may vary (e.g. a new haircut, wearing sunglasses, a hat, etc.). In turn, the face recognition module 26 may establish a potential match having a low confidence level due to new variations in physical appearance of the driver. However, other recognition modules, such as the voice recognition module 28, may establish a potential match having a relatively consistent confidence level when compared to past driving episodes (the voice of the driver has not varied). Although the potential match and corresponding confidence level received from the face recognition module 26 may be relatively low, the identity manager 36 may generate an overall confidence level sufficiently high enough (value meets or exceeds pre-defined threshold value) to determine the driver to be a registered user based on evaluating input from all of the recognition modules. As such, the identity manager 36 may be configured to update the identified driver user model and/or user profile 34 with all of the captured data from each of the sensors. In this instance, although the confidence level of a potential match from the face recognition module 26 was relatively low, the captured images of the driver will be stored in the user model 42 and/or user profile 34, wherein the ability of the face recognition module 26 to establish a potential match with a higher degree of certainty (higher confidence level) in future driving episodes may be greatly improved. This in turn allows the modeling of a registered user to evolve over a period of time (e.g. over a period of driving episodes), wherein the recognition modules can better adapt to variations in characteristics of the driver and/or passengers.

The in-vehicle system 12 is configured to communicate with the network service 18. The network service 18 is configured to provide the in-vehicle system 12 with archiving, audit, and/or escalation services. For example, the network service 18 may be configured to provide updates to each of the recognition modules 26, 28, 30, updating the internal modeling and analyzing methodologies. The network service 18 may also be configured to configure and/or reset the registered user database 32. For instance, when there is a change in vehicle ownership, it may be desirable to reset the registered user database 32 such that only authorized users according to the desire of the new vehicle owner be registered with the vehicle.

Additionally, the network service 18 may be configured to provide notification information to registered users of the vehicle, such as the vehicle owner. For example, in the event that an occupant of the vehicle is identified as an unregistered user (e.g. an unauthorized user), the network service 18 may be configured to communicate with a registered user, such as the vehicle owner, and alert them that unauthorized access to the vehicle by an unregistered user has occurred. The network service 18 may be configured to receive and store data captured by each of the sensors related to the unauthorized user. In particular, the identity manager 36 may be configured to transmit images captured by the camera 20 and voice data capture by the microphone 22 to the network service 18. Attributes related to the captured data may also be transmitted to the network service 18, including, but not limited to, time, date, and location. The captured data may further be encrypted within the network service 18 and access to such data may be restricted, such that access to such data is allowed only by consent of the vehicle owner.

The network service 18 may be configured to notify the vehicle owner that an unauthorized user has accessed and/or attempted to operate the vehicle and allow the vehicle owner to access the captured data related to the unauthorized user. As generally understood by one skilled in the art, the vehicle owner may be notified via email, SMS, and/or other means of communication.

In the event that the vehicle owner does not wish to grant authorization to the use of the vehicle, the vehicle owner may then alert the proper authorities of the unauthorized access to the vehicle. Alternatively, the vehicle owner may grant authorization to the occupant of the vehicle via the network service 18. In particular, the network service 18 may be configured receive a grant of authorization from the vehicle owner and communicate such a grant of authorization to the in-vehicle system 12. In turn, the identity manager 36 may be configured to generate a user profile 34 associated with the vehicle occupant, including the captured data, and register the user profile 34 with the registered user database 32.

Turning now to FIG. 3, a flowchart of one embodiment of a method 300 for identifying an occupant of a vehicle as an authorized user of the vehicle is illustrated. The method 300 includes capturing data related to an occupant of a vehicle (operation 310). Data may be captured by one of a plurality of sensors. The data may be captured by a variety of sensors configured to detect various attributes of an occupant of a vehicle, including, but not limited to physical characteristics and/or driving style. For example, sensors may include, but are not limited to, steering, acceleration, and/or braking monitors, electronic key proximity sensors, cameras, microphones, seat weight sensors, and various biometric characteristics sensors (fingerprints, finger veins, iris, retina, handprint, etc.).

One or more occupant characteristics may be identified from the captured data (operation 320). In particular, recognition modules may receive data captured by associated sensors, wherein each of the recognition modules may analyze the captured data to determine one or more of the following occupant characteristics: occupant's physical characteristics, including, but not limited to, weight, facial characteristics, voice pattern, fingerprints, finger veins, iris, retina, handprint, etc. Additionally, each of the recognition modules may determine occupant's driving style (e.g. braking, acceleration, turning habits, etc.).

The method 300 further includes identifying a user profile having data corresponding to the occupant characteristics and determining a confidence level corresponding to the identified user profile (operation 330). For example, each recognition modules is configured to establish a potential identity match of the occupant by comparing the one or more characteristics of the occupant with stored data corresponding to registered user profiles in a user database. Each registered user profile may include indentifying data of an associated user of the vehicle. The identifying data, for example, may include various physical characteristics (e.g. weight, facial characteristics, voice pattern, fingerprints, finger veins, iris, retina, handprint, etc.) as well as driving style of the user. Upon establishing a potential matching user profile, each recognition module is configured to determine a confidence level corresponding to the potential match.

The method 300 further includes determining occupant is a registered user of the vehicle based on the identified user profile and corresponding confidence level (operation 340). For example, an identity manager may receive the potential matching user profile for each of the recognition modules, upon which the identity manager may be configured to determine an overall assessment of the identity of the occupant. In particular, the identity manager may be configured to generate an overall confidence level, wherein if the overall confidence level meets or exceeds a pre-defined threshold value, the identity manager may determine that the occupant is a registered user. Alternatively, if the overall confidence level is below the pre-defined threshold value, the identity manager may determine that the occupant is not a registered user.

While FIG. 3 illustrates method operations according various embodiments, it is to be understood that in any embodiment not all of these operations are necessary. Indeed, it is fully contemplated herein that in other embodiments of the present disclosure, the operations depicted in FIG. 3 may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Consistent with one embodiment of the present disclosure, there is provided a method for identifying an occupant of a vehicle as an authorized user of the vehicle. The method may include receiving, by one of a plurality of recognition modules, data captured by an associated one of a plurality of sensors. The method may further include identifying, by the one of the plurality of recognition modules, one or more occupant characteristics based on the data. The method may further include identifying, by the one of the plurality of recognition modules, a user profile stored in a registered user database having data corresponding to the one or more occupant characteristics and determining a confidence level associated with the identified user profile. The method may further include receiving, by an identity manager, the identified user profile and corresponding confidence level from the one of the plurality of recognition modules and evaluating the identified user profile and corresponding confidence level. The method may further include determining, by the identity manager, a global assessment of an identity of the occupant based on the evaluation of at least the identified user profile and corresponding confidence level, the global assessment comprising an overall confidence level. The method may further include determining, by the identity manager, that the occupant is a registered user of the vehicle based on the overall confidence level.

Consistent with another embodiment of the present disclosure, there is provided a system for identifying an occupant of a vehicle as an authorized user of the vehicle. The system may, include a registered user database having at least one user profile stored therein. The at least one registered user profile corresponding to a user authorized to access and/or operate the vehicle. The system may further include a plurality of recognition modules, each of the plurality of recognition modules configured to receive data from an associated one of a plurality of sensors and to identify one or more occupant characteristics based on the data. Each of the plurality of recognition modules being configured to identify a registered user profile stored in the registered user database having data corresponding to the one or more occupant characteristics. Each of the plurality of recognition modules may be further configured to determine a confidence level associated with the identified registered user profile. The system may further include an identity manager configured to receive the identified registered user profile and corresponding confidence level from each of the plurality of recognition modules. The identity manager may be further configured to determine a global assessment of an identity of the occupant based on an evaluation of the identified user profile and corresponding confidence level from each of the plurality of recognition modules, wherein the global assessment includes an overall confidence level. The identity manager may be further configured to determine whether the occupant is a registered user of the vehicle based on the overall confidence level.

Consistent with yet another embodiment of the present disclosure, there is provided a tangible computer-readable medium including instructions stored thereon. When executed by one or more processors, the instructions may cause a computer system to perform operations including receiving, by one of a plurality of recognition modules, data captured by an associated one of a plurality of sensors; identifying, by the one of the plurality of recognition modules, one or more occupant characteristics based on the data; identifying, by the one of the plurality of recognition modules, a user profile stored in a registered user database having data corresponding to the one or more occupant characteristics and determining a confidence level associated with the identified user profile; receiving, by an identity manager, the identified user profile and corresponding confidence level from the one of the plurality of recognition modules and evaluating the identified user profile and corresponding confidence level; determining, by the identity manager, a global assessment of an identity of the occupant based on the evaluation of at least the identified user profile and corresponding confidence level, the global assessment comprising an overall confidence level; and determining, by the identity manager, that the occupant is a registered user of the vehicle based on the overall confidence level.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

As used in any embodiment herein, the term "module" refers to software, firmware and/or circuitry configured to perform the stated operations. The software may be embodied as a software package, code and/or instruction set or instructions, and "circuitry", as used in any embodiment herein, may comprise, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), etc.

Certain embodiments described herein may be provided as a tangible machine-readable medium storing computer-executable instructions that, if executed by the computer, cause the computer to perform the methods and/or operations described herein. The tangible computer-readable medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The computer may include any suitable processing platform, device or system, computing platform, device or system and may be implemented using any suitable combination of hardware and/or software. The instructions may include any suitable type of code and may be implemented using any suitable programming language.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

What is claimed is:

1. A system for identifying an occupant of a vehicle as an authorized user of said vehicle, said system comprising:
a registered user database having one or more user profiles stored therein, said one or more user profiles including at least one user profile corresponding to an authorized user that is authorized to access and/or operate said vehicle, each of said user profiles including one or more reference driving patterns;
a plurality of recognition modules, each of said plurality of recognition modules configured to receive data from an associated one of a plurality of sensors and to identify one or more occupant characteristics based on said data, each of said plurality of recognition modules being configured to identify a registered user profile stored in said registered user database having data corresponding to said one or more occupant characteristics and to determine a confidence level associated with said identified registered user profile;
a vehicle dynamics recognition module to:
receive data captured by a vehicle dynamics monitor and identify an identified driving pattern of a driver of said vehicle;
compare the identified driving pattern to the one or more reference driving patterns to determine at least one user profile that is a potential match to said driver and to determine an identity of said driver; and
determine a confidence level associated with said identity of said driver; and
an identity manager configured to receive said identified registered user profile and corresponding confidence level from each of said plurality of recognition modules and to determine a global assessment of an identity of said occupant based on an evaluation of said identified user profile and corresponding confidence level from each of said plurality of recognition modules, said global assessment comprises an overall confidence level;
wherein said identity manager is further configured to:
determine whether said occupant is a registered user of said vehicle based on said overall confidence level; and
when said occupant is determined to be an unregistered user, to transmit a signal to a network service over a network, wherein the signal is configured to cause the network service to notify at least one registered user or owner of the vehicle of the presence of said occupant in said vehicle, said notification requesting consent from the at least one registered user or owner of the vehicle for the occupant to operate said vehicle.

2. The system of claim 1 wherein each of said plurality of recognition modules is configured to identify a user model stored in an occupant database having data corresponding to said one or more occupant characteristics.

3. The system of claim 2 wherein each of said plurality of recognition modules is configured to compare said identified user model and associated data with at least one user profile of said registered user database.

4. The system of claim 3 wherein said identity manager is further configured to provide said global assessment to each of said plurality of recognition modules, wherein each of said plurality of recognition modules is configured to adjust said identified user model based on said global assessment.

5. The system of claim 1 wherein when said occupant is determined to be an authorized user, said identity manager is configured to allow occupant to operate said vehicle.

6. The system of claim 1 wherein said identity manager is configured to manage vehicle components based on personal preferences of an identified registered user profile.

7. The system of claim 6 wherein said identity manager is configured to automatically adjust parameters of said vehicle components in accordance with personal preferences stored in said identified user profile.

8. The system of claim 1 wherein when said occupant is determined to be an unregistered user, said identity manager is configured to restrict occupant from operating said vehicle until consent from the at least one registered user or owner of the vehicle for the occupant to operate said vehicle is received.

9. The system of claim 1 wherein said signal comprises said data captured by said vehicle dynamics monitor.

10. A method for identifying an occupant of a vehicle as an authorized user of said vehicle, said method comprising:
receiving, by one of a plurality of recognition modules, data captured by an associated one of a plurality of sensors and identifying, by said one of said plurality of recognition modules, one or more occupant characteristics based on said data;
receiving, by a vehicle dynamics recognition module, vehicle dynamics data captured by a vehicle dynamics monitor;
identifying, with said vehicle dynamics recognition module, a driving pattern of a driver of said vehicle based on said vehicle dynamics data;
identifying, by said one of said plurality of recognition modules, a user profile stored in a registered user database having data corresponding to said one or more occupant characteristics and determining, by said one of said plurality of recognition modules, a confidence level associated with said identified user profile;
determining, with said vehicle dynamics recognition module, an identity of said driver based at least in part on said identified driving pattern, and determining a confidence level associated with said identity of said driver;
receiving, by an identity manager, said identified user profile and corresponding confidence level from said one of said plurality of recognition modules and evaluating, by said identity manager, said identified user profile and corresponding confidence level from said one of said plurality of recognition modules;
determining, by said identity manager, a global assessment of an identity of said occupant based on said evaluation of at least said identified user profile and corresponding confidence level, said global assessment comprising an overall confidence level;
determining, by said identity manager, whether said occupant is a registered user of said vehicle based on said overall confidence level; and
when said occupant is determined to be an unregistered user, transmitting a signal to a network service over a network, wherein the signal is configured to cause the network service to notify at least one registered user or owner of the vehicle of the presence of said occupant in said vehicle, said notification requesting consent from the at least one registered user or owner of the vehicle for the occupant to operate said vehicle.

11. The method of claim 10 further comprising allowing said occupant to operate said vehicle, when said occupant is determined to be a registered user.

12. The method of claim 10 further comprising managing vehicle components based on personal preferences of said identified user profile.

13. The method of claim 12 wherein managing vehicle components comprises automatically adjusting parameters of said vehicle components in accordance with personal preferences stored in said identified user profile.

14. The method of claim 10 further comprising identifying, by said one of said plurality of recognition modules, a user model stored in an occupant database having data corresponding to said one or more occupant characteristics.

15. The method of claim 14 wherein identifying a user profile comprises comparing said user model and associated data with at least one user profile of said registered user database.

16. The method of claim 10 further comprising updating said identified user profile with said data captured by said one of said plurality of recognition modules.

17. The method of claim 10, wherein said signal comprises said data captured by said vehicle dynamics monitor.

18. At least one non-transitory computer readable medium having instructions stored thereon which, when executed by one or more processors, cause a computer system to perform operations comprising:
receiving, by one of a plurality of recognition modules, data captured by an associated one of a plurality of sensors;
receiving, by a vehicle dynamics recognition module, vehicle dynamics data captured by a vehicle dynamics monitor;
identifying, by said one of said plurality of recognition modules, one or more characteristics of an occupant of a vehicle based on said data;
identifying, with said vehicle dynamics recognition module, a driving pattern of a driver of said vehicle based on said vehicle dynamics data;
identifying, by said one of said plurality of recognition modules, a user profile stored in a registered user database having data corresponding to said one or more characteristics of said occupant;
determining, with said vehicle dynamics recognition module, an identity of said driver based at least in part on said identified driving pattern;
determining, by said one of said plurality of recognition modules, a confidence level associated with said identified user profile;
determining a confidence level associated with said identity of said driver;
receiving, by an identity manager, said identified user profile and corresponding confidence level from said one of said plurality of recognition modules;

evaluating, by said identity manager, said identified user profile and corresponding confidence level from said one of said plurality of recognition modules;

determining, by said identity manager, a global assessment of an identity of said occupant based on said evaluation of at least said identified user profile and corresponding confidence level, said global assessment comprising an overall confidence level;

determining, by said identity manager, whether said occupant is a registered user of said vehicle based on said overall confidence level; and when said occupant is determined to be an unregistered user, transmitting a signal to a network service over a network, wherein the signal is configured to cause the network service to notify at least one registered user or owner of the vehicle of the presence of said occupant in said vehicle, said notification requesting consent from the at least one registered user or owner of the vehicle for the occupant to operate said vehicle.

19. The non-transitory computer readable medium of claim 18 wherein the instructions that when executed by one or more the processors result in the following additional operations comprising:

allowing said occupant to operate said vehicle when it is determined that said occupant is a registered user.

20. The non-transitory computer readable medium of claim 18 wherein the instructions that when executed by one or more the processors result in the following additional operations comprising:

managing vehicle components based on personal preferences of said identified user profile, wherein managing vehicle components comprises automatically adjusting parameters of said vehicle components in accordance with personal preferences stored in said identified user profile.

21. The non-transitory computer readable medium of claim 18 wherein the instructions that when executed by one or more the processors result in the following additional operations comprising:

identifying, by said one of said plurality of recognition modules, a user model stored in an occupant database having data corresponding to said one or more occupant characteristics.

22. The non-transitory computer readable medium of claim 21 wherein identifying a user profile comprises comparing said user model and associated data with at least one user profile of said registered user database.

23. The non-transitory computer readable medium of claim 22 wherein the instructions that when executed by one or more the processors result in the following additional operations comprising:

providing, by said identity manager, said global assessment to at least said one of said plurality of recognition modules, wherein said one of said plurality of recognition modules is configured to adjust said user model based on said global assessment.

* * * * *